Patented Apr. 9, 1940

2,196,221

UNITED STATES PATENT OFFICE 2,196,221

AZO COMPOUNDS AND PROCESS FOR COLORING THEREWITH

James G. McNally and Joseph B. Dickey, Rochester, N. Y., assignors to Eastman Kodak Company, Rochester, N. Y., a corporation of New Jersey No Drawing. Application June 10, 1937, Serial No. 147,541

10 Claims. (Cl. 8—50)

This invention relates to aryl azo compounds. More particularly it relates to nuclear non-sulfonated aryl azo compounds suitable for the coloration of organic derivatives of cellulose. The invention includes the azo compounds, the process for their preparation, the process of coloring with them, and materials colored with the azo compounds of the invention.

Organic derivatives of cellulose are characterized by an indifferent affinity for the usual cotton or wool dyes, especially the ordinary water-soluble dyes. Typical organic derivatives of cellulose include the hydrolyzed as well as the unhydrolyzed cellulose organic acid esters, such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose.

We have discovered that a valuable series of aryl azo compounds can be obtained by coupling aryl diazonium salts with compounds of the type represented by the formula:

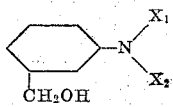

wherein $X_1$ and $X_2$ each represent a member selected from the class consisting of hydrogen, an alkyl group, a hydroxyalkyl group and the glyceryl radical.

The compounds of our invention have the probable formula:

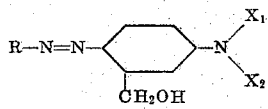

wherein $X_1$ and $X_2$ have the meaning above given and R represents an aryl nucleus. Advantageously, R is an aryl nucleus of the benzene series.

The nuclear non-sulfonated aryl azo compounds of the invention constitute valuable dyes which may be employed for the dyeing or coloration of materials made of or containing organic derivatives of cellulose. The dyeings produced employing said nuclear non-sulfonated aryl azo compounds are, in general, of good fastness to light and washing. The nuclear sulfonated compounds which may be prepared by sulfonation of the non-sulfonated aryl azo compounds in known fashion have little or no practical utility for the coloration of organic derivatives of cellulose but may be employed to color textile materials such as wool and cotton. Purple shades and shades ranging from yellow to red can be produced employing the compounds of the invention.

The following examples illustrate the method of preparation of the azo compounds of our invention.

EXAMPLE 1

17.2 grams of p-bromoaniline are dissolved in 150 cc. of water and 25 cc. of 36% hydrochloric acid. The resulting solution is cooled by the addition of ice, for example, to a temperature of 0–5° C. and diazotized by the addition of 6.9 grams of sodium nitrite dissolved in water.

12.3 grams of m-aminobenzyl alcohol are dissolved in 200 cc. of water containing 15 cc. of 36% hydrochloric acid. The resulting solution is iced and the diazo solution prepared as described above is added with stirring. The solution is then slowly neutralized to Congo red paper by the addition of sodium acetate. When coupling is complete, the dye compound formed is recovered by filtration, washed with water and dried. The dye compound formed has the formula:

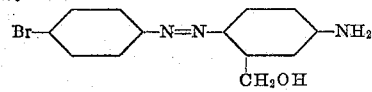

and colors cellulose acetate silk yellow from an aqueous suspension.

While the above coupling reaction was carried out in a hydrochloric acid solution, it can be equally well carried out in acetic acid.

EXAMPLE 2

16.7 grams of m-β-hydroxyethylaminobenzyl alcohol are dissolved in 100 cc. of glacial acetic acid and the resulting solution is cooled to a temperature approximating 0–10° C. The diazo solution prepared as described in Example 1 is then slowly added with stirring to effect coupling. Upon the addition of the diazonium solution, the mixture is made neutral to Congo red paper by the addition of sodium acetate. When coupling is complete, the dye compound formed is precipitated by the addition of water, filtered, washed with water and dried. The dye compound has the formula:

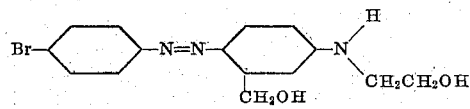

and colors cellulose acetate silk orange yellow from an aqueous suspension.

m-Dimethylaminobenzyl alcohol can be coupled with p-bromobenzene diazonium chloride in an exactly similar manner to form a dye which yields orange yellow dyeings.

Example 3

16.8 grams of 1-amino-2-methoxy-4-nitrobenzene are dissolved by warming in 200 cc. of water containing 30 cc. of 36% hydrochloric acid. The resulting solution is then cooled to a temperature of 0-5° C. by the addition of ice and diazotized in the usual manner by the addition of 6.9 grams of sodium nitrite dissolved in water.

12.3 grams of m-aminobenzyl alcohol are dissolved in 100 cc. of glacial acetic acid and the resulting solution is cooled to a temperature approximating 0-10° C. The diazonium solution prepared as described above is then added with stirring. The coupling reaction which takes place is completed by adding sodium acetate until the solution is no longer acid to Congo red paper. The dye compound formed is precipitated by the addition of water, recovered by filtration, washed with water and dried. The dye compound formed has the formula:

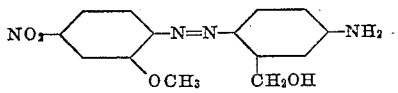

and colors cellulose acetate silk orange from an aqueous suspension.

Example 4

16.7 grams of m-β-hydroxyethylaminobenzyl alcohol are dissolved in 100 cc. of glacial acetic acid and the resulting solution is cooled to a temperature approximating 0-10° C. The diazo solution prepared as described in Example 3 is added with stirring and the coupling reaction which takes place is completed by adding sodium acetate until the solution is neutral to Congo red paper. The dye compound formed is precipitated by the addition of water, recovered by filtration, washed with water and dried. The dye compound formed has the formula:

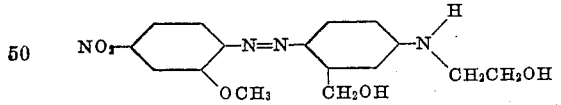

and colors cellulose acetate silk orange-red from an aqueous suspension.

Example 5

15.1 grams of m-dimethylaminobenzyl alcohol are dissolved in 100 cc. of glacial acetic acid and the resulting solution is cooled to a temperature approximating 0-10° C. by the addition of ice. The diazo solution prepared as described in Example 3 is added with stirring and the coupling reaction which takes place is completed by adding sodium acetate until the solution is neutral to Congo red paper. The dye compound formed is precipitated by the addition of water, filtered, washed with water and dried. The dye compound formed has the formula:

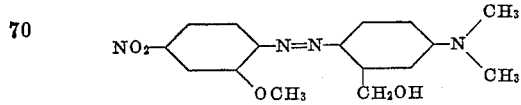

and colors cellulose acetate silk red from an aqueous suspension.

Example 6

A. 7.6 grams of powdered sodium nitrite are dissolved in 53 cc. of cold concentrated sulfuric acid. (Specific gravity 1.83 to 1.84.) Following the addition, the solution is warmed to a temperature not over 70° C. and then cooled to a temperature of 10-15° C.

B. 18.3 grams of 2,4-dinitroaniline are dissolved in 220 cc. of hot glacial acetic acid. The resulting solution is rapidly cooled to room temperature. The solution prepared in A is added with stirring to the glacial acetic acid solution of 2,4-dinitroaniline. This addition takes place over a period of 30-45 minutes while maintaining a temperature of 10-15° C. Following the addition the resulting solution is stirred for thirty minutes and one gram of urea is added to remove any excess nitrous acid.

12.3 grams of m-aminobenzyl alcohol are dissolved in a minimum quantity of glacial acetic acid and the solution formed is cooled to a temperature approximating 0-10° C. The diazo solution prepared above is then added with stirring and the coupling reaction which takes place is completed by the addition of sodium acetate until the solution is neutral to Congo red paper. The dye compound formed is precipitated by the addition of water, recovered by filtration, washed with water and dried. The dye compound formed has the formula:

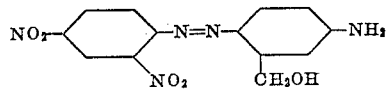

and colors cellulose acetate silk red from an aqueous suspension.

m-β-hydroxyethylaminobenzyl alcohol and m-dimethylaminobenzyl alcohol, for example, may be substituted for the m-aminobenzyl alcohol of the example and coupled exactly as described above. The dyes thus formed color cellulose acetate silk orange red and red respectively, from an aqueous suspension.

Example 7

21.7 grams of 1-amino-2-bromo-4-nitrobenzene are diazotized in the usual manner.

19.7 grams of m-glycerylaminobenzyl alcohol are dissolved in cold dilute sulfuric acid and the diazo solution of the 1-amino-2-bromo-4-nitrobenzene is added with stirring. Upon addition of the diazo solution, the mixture is allowed to stand for a short time and the coupling reaction which takes place is completed by adding sodium acetate until the solution is neutral to Congo red paper. The dye compound formed is recovered by filtration, washed with water and dried. The dye compound has the formula:

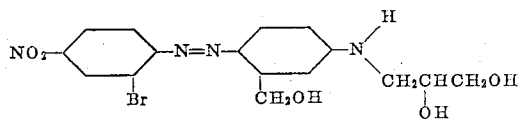

and colors cellulose acetate silk rubine from an aqueous suspension.

In place of the mono-glyceryl compound of the example, an equal molecular proportion of m-diglycerylaminobenzyl alcohol may be employed and coupled as described in the example.

Example 8

21.8 grams of 1-amino-2,4-dinitro-6-chlorobenzene are diazotized and coupled with 22.5 grams of m-ethylglycerylaminobenzyl alcohol dissolved in cold dilute hydrochloric acid. The coupling reaction and recovery of the dye compound formed may be carried out as described in Example 1. The dye compound formed has the formula:

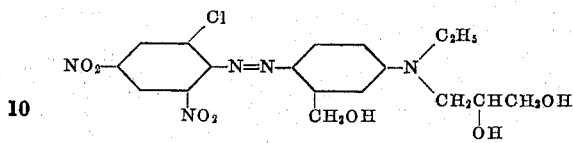

and colors cellulose acetate silk violet from an aqueous suspension.

EXAMPLE 9

17.3 grams of 1-amino-2-chloro-4-nitrobenzene are diazotized and coupled in the usual manner with 19.5 grams of m-ethyl-β-hydroxyethylaminobenzyl alcohol dissolved in cold dilute hydrochloric acid. The coupling and recovery of the dye compound may be carried out in accordance with the method disclosed in Example 1. The dye compound formed has the formula:

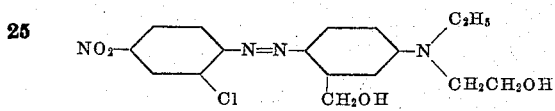

and colors cellulose acetate silk rubine from an aqueous suspension.

In order that our invention may be fully understood, the preparation of a number of coupling components employed in the preparation of the azo compounds of our invention is disclosed hereinafter.

*Preparation of m-aminobenzyl alcohol*

This compound may be prepared as described in "Berichte der Deutschen Chemischen Gesellschaft", vol. 30, page 1065 (1897).

*Preparation of methyl-m-aminobenzyl alcohol*

119 grams of m-aminobenzyl alcohol and 106 grams of sodium carbonate are heated under reflux in an oil bath at a temperature of about 60° C. and 160 grams of methyl iodide are added dropwise with stirring over a period of one hour. Following the addition of the methyl iodide, refluxing is continued for two hours following which the reaction mixture is cooled and extracted with benzene. The benzene extract is fractionally distilled to give an excellent yield of methyl-m-aminobenzyl alcohol.

*Preparation of dimethyl-m-aminobenzyl alcohol*

119 grams of m-aminobenzyl alcohol and 150 grams of sodium carbonate are refluxed at about 60° C. and 320 grams of methyl iodide are added dropwise with stirring over a period of one hour. After the addition of the methyl iodide, the mixture is refluxed for an additional two hours following which it is cooled and extracted with benzene. Dimethyl-m-aminobenzyl alcohol can be recovered from the benzene extract by fractional distillation.

*Preparation of β-hydroxyethyl-m-aminobenzyl alcohol*

240 grams of m-aminobenzyl alcohol and 75 grams of ethylene chlorohydrin are heated at a temperature sufficiently high to effect refluxing (about 130–135° C.) for four hours. Aqueous sodium hydroxide is then added until the reaction mixture is alkaline to litmus following which the alkaline reaction mixture is extracted with benzene. β-hydroxyethyl-m-aminobenzyl alcohol may be recovered from the benzene extract by fractional distillation under reduced pressure.

*Preparation of di-β-hydroxyethyl-m-aminobenzyl alcohol*

119 grams of m-aminobenzyl alcohol are heated to boiling with 220 grams of ethylene chlorohydrin. Aqueous 10% sodium hydroxide solution is added dropwise with vigorous stirring over a period of four hours to the reaction mixture and following its addition, refluxing is continued for one hour. Upon cooling, the mixture resulting is extracted with benzene and the benzene extract is fractionally distilled under reduced pressure to give di-β-hydroxyethyl-m-aminobenzyl alcohol.

*Preparation of glyceryl-m-aminobenzyl alcohol*

This compound may be prepared by refluxing m-aminobenzyl alcohol and

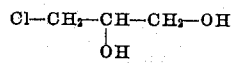

in equal molar proportions, in the presence of an acid binding agent such as sodium carbonate. Upon completion of the condensation reaction which takes place, the reaction mixture is cooled and extracted with benzene. Glyceryl-m-aminobenzyl alcohol may be recovered by fractional distillation of the benzene extract.

*Preparation of diglyceryl-m-aminobenzyl alcohol*

This compound may be prepared by refluxing m-aminobenzyl alcohol and

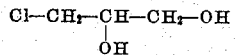

in the proportion of one mole of m-aminobenzyl alcohol to two moles of

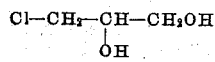

in the presence of an acid binding agent such as sodium carbonate. Upon completion of the refluxing reaction, diglyceryl-m-amino-benzyl alcohol may be recovered by extracting the reaction mixture with benzene and fractionally distilling the benzene extract.

Compounds wherein the amino group of m-aminobenzyl alcohol is substituted with two different members selected from the class consisting of an alkyl group, a hydroxyalkyl group and the glyceryl radical may be prepared by replacing one of the hydrogen atoms of the amino group with one of these members and treating the compound obtained in turn to replace the remaining hydrogen atom of the amino group with a second member. The replacement of the hydrogen atoms of the amino group may be effected in accordance with the processes above described showing the substitution of the amino group with each of the above members individually.

The following tabulation further illustrates the compounds included within the scope of our invention together with the color they produce on cellulose acetate silk. The compounds indicated below may be prepared by diazotizing the amines listed under the heading "Amine" and coupling with the compounds specified in the column entitled "Coupling component." The diazotization and coupling reactions, may, for example, be carried out following the general procedure described in Examples 1 to 9 inclusive.

| Amine | Coupling component | Color on cellulose acetate silk |
|---|---|---|
| p-Nitroaniline | m-Aminobenzyl alcohol | Orange-red. |
| Do | m-β-hydroxethylaminobenzyl alcohol | Red. |
| Do | m-Di-β-hydroxyethylaminobenzyl alcohol | Do. |
| Do | m-Dimethylaminobenzyl alcohol | Do. |
| 2-methoxy-4-nitroaniline | m-Di-β-hydroxyethylaminobenzyl alcohol | Orange-red. |
| 2-chloro-4-nitroaniline | m-Aminobenzyl alcohol | Red. |
| Do | m-β-hydroxyethylaminobenzyl alcohol | Rubine. |
| Do | m-Di-β-hydroxyethylaminobenzyl alcohol | Red. |
| Do | m-Dimethylaminobenzyl alcohol | Purple. |
| 2,4-dinitroaniline | m-Di-β-hydroxyethylaminobenzyl alcohol | Orange yellow. |
| p-Aminoacetophenone | m-Aminobenzyl alcohol | Orange. |
| Do | m-β-hydroxyethylaminobenzyl alcohol | Do. |
| Do | m-Di-β-hydroxyethylaminobenzyl alcohol | Do. |
| Do | m-Dimethylaminobenzyl alcohol | Orange yellow. |
| p-Bromoaniline | m-Di-β-hydroxyethylaminobenzyl alcohol | Orange. |
| o-Nitroaniline | m-Aminobenzyl alcohol | Do. |
| Do | m-β-hydroxyethylaminobenzyl alcohol | Orange red. |
| Do | m-Di-β-hydroxyethylaminobenzyl alcohol | Orange. |
| Do | m-Dimethylaminobenzyl alcohol | Orange red. |
| 2-nitro-4-chloroaniline | m-Aminobenzyl alcohol | Do. |
| Do | m-β-hydroxyethylaminobenzyl alcohol | Do. |
| Do | m-Di-β-hydroxyethylaminobenzyl alcohol | Orange yellow. |
| Do | m-Dimethylaminobenzyl alcohol | Orange. |
| 2,4-dichloroaniline | m-Aminobenzyl alcohol | Do. |
| Do | m-β-hydroxyethylaminobenzyl alcohol | Do. |
| Do | m-Di-β-hydroxyethylaminobenzyl alcohol | Yellow. |
| Do | m-Dimethylaminobenzyl alcohol | Orange yellow. |
| m-Nitroaniline | m-Aminobenzyl alcohol | Do. |
| Do | m-β-hydroxyethylaminobenzyl alcohol | Do. |
| Do | m-Di-β-hydroxyethylaminobenzyl alcohol | Rubine. |
| Do | m-Dimethylaminobenzyl alcohol | Violet. |
| 2,4-dinitro-6-bromoaniline | m-Aminobenzyl alcohol | Purple. |
| Do | m-β-hydroxyethylaminobenzyl alcohol | Violet. |
| Do | m-Di-β-hydroxyethylaminobenzyl alcohol | |
| Do | m-Dimethylaminobenzyl alcohol | |

In order that the application of the compounds of our invention may be clearly understood their application for the direct dyeing or coloration of materials made of or containing an organic derivative of cellulose, and more particularly cellulose acetate silk, is described hereinafter. Although the remarks are more particularly directed to the dyeing or coloring of the above mentioned materials, those pertaining to temperature, the dispersing agents and the amounts of dispersing agent and dye which may be employed, for example, are of general applicability where the dye is to be applied directly to the fiber from an aqueous suspension. The general methods by which the dye compounds may be applied to the coloration of other materials are well known in the art and need not be described here.

In employing the aromatic azo derivatives of our invention as dyes, they will ordinarily be applied to the material in the form of an aqueous suspension which can be prepared by grinding the dye to a paste in the presence of a sulfonated oil, soap, or other suitable dispersing agent and dispersing the resulting paste in water. Dyeing operations can, with advantage, be conducted at a temperature of 80–85° C., but any suitable temperature may be used. In accordance with the usual dyeing practice, the material to be dyed will ordinarily be added to the aqueous dye bath at a temperature lower than that at which the main portion of the dyeing is to be effected, a temperature approximating 45–45° C., for example, following which the temperature of the dye-bath will be raised to that selected for carrying out the dyeing operation. The temperature at which the dyeing is conducted will vary somewhat, depending, for example, on the particular material or materials undergoing coloration.

The amount of dispersing agent employed may be varied over wide limits. Amounts approximating 10 to 200% by weight on the dye may be employed, for example. These amounts are not to be taken as limits as greater or lesser amounts can be used. To illustrate, if the dye is ground to a sufficiently fine powder dyeing can be satisfactorily carried out without the aid of a dispersing agent. Generally speaking, however, the use of a dispersing agent is desirable.

Advantageously, dyeing is carried out in a substantially neutral dyebath. Perhaps, more accurately, it should be stated that dyeing should not be carried out in an alkaline dyebath, that is, one having any substantial alkalinity, since the presence of free alkali appears to affect the dyeing adversely. Dyeing in an acid dyebath is not recommended because of the tendency of acids to affect the material undergoing dyeing adversely. Because of these considerations, when a dispersing agent is to be employed, preferably it is neutral or substantially neutral.

It will be understood that the azo compounds of our invention may be applied to the material to be colored in any suitable manner. Coloration may be effected, for example, by dyeing, printing, or stenciling. Dispersing or solubilizing agents that can be employed for preparing suspensions of the dye include soap, sulphoricinoleic acid, salts of sulphoricinoleic acid, a water soluble salt of cellulose phthalate, cellulose succinate or cellulose mono-acetate diphthalate, for example, the sodium, potassium or ammonium salts, and sulfonated oleic, stearic or palmitic acid, or salts thereof, such, for example, as the sodium or ammonium salts.

While it is preferred to effect coloration by applying the dye compound from an aqueous dyebath directly to the material to be colored, coloration may be effected by absorbing and diazotizing an amine on the fiber after which the dye is formed in situ by developing with a coupling component such as m-aminobenzyl alcohol, m-β-hydroxyethylaminobenzyl alcohol or m-dimethylaminobenzyl alcohol, for example. The following examples illustrate how dyeing may be carried out in accordance with our invention. Quantities are expressed in parts by weight.

Example A 2.5 parts of

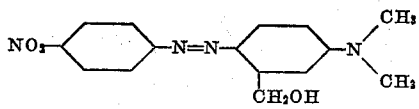

are finely ground with a dispersing agent such as soap or oleyl glyceryl sulfate and the resulting paste is dispersed in 1000 parts of water. The dispersion thus prepared is heated to a temperature approximating 45-55° C. and 100 parts of cellulose acetate silk, in the form of yarn or fabric, for example, are added to the dyebath after which the temperature is gradually raised to 80-85° C. and the silk worked for several hours at this latter temperature. Sodium chloride may be added as desired during the dyeing operation to promote exhaustion of the dyebath. Upon completion of the dyeing operation, the cellulose acetate silk is removed, washed with soap, rinsed and dried. The cellulose acetate silk is colored a red shade of good fastness to light.

Example B 2.5 parts of

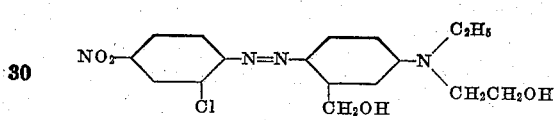

are finely ground with a dispersing agent such as soap or oleyl glyceryl sulfate and the resulting paste is dispersed in 1000 parts of water. The dispersion thus prepared is heated to a temperature approximating 45-55° C. and 100 parts of cellulose acetate silk, in the form of yarn or fabric, for example, are added to the dyebath after which the temperature is gradually raised to 80-85° C. and the silk worked for several hours at this latter temperature. Sodium chloride may be added as desired during the dyeing operation to promote exhaustion of the dyebath. Upon completion of the dyeing operation, the cellulose acetate silk is removed, washed with soap, rinsed and dried. The cellulose acetate silk is colored a rubine shade of good fastness to light.

Example C 2.5 parts of

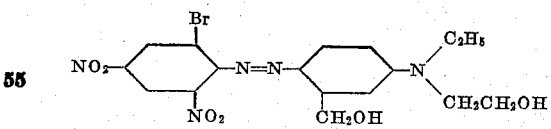

are finely ground with a dispersing agent such as soap or oleyl glyceryl sulfate and the resulting paste is dispersed in 1000 parts of water. The dispersion thus prepared is heated to a temperature approximating 45-55° C. and 100 parts of cellulose acetate silk, in the form of yarn or fabric, for example, are added to the dyebath after which the temperature is gradually raised to 80-85° C. and the silk worked for several hours at this latter temperature. Sodium chloride may be added as desired during the dyeing operation to promote exhaustion of the dyebath. Upon completion of the dyeing operation, the cellulose acetate silk is removed, washed with soap, rinsed and dried. The cellulose acetate silk is colored a violet shade of good fastness to light.

While our invention has been illustrated in connection with the dyeing of cellulose acetate silk, it will be understood that dyeing operations can be carried out in a manner similar to that described above by the substitution of another organic derivative of cellulose material for cellulose acetate silk or by employing dye compounds other than those employed in the example, or by substitution of both the material being dyed and the dye compounds of the examples.

We claim:

1. An azo compound having the general formula:

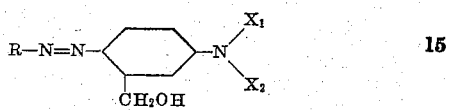

wherein $X_1$ and $X_2$ each represent a member selected from the class consisting of hydrogen, an alkyl group, a hydroxyalkyl group and the glyceryl radical and R represents an aryl nucleus of the benzene series.

2. An azo compound having the general formula:

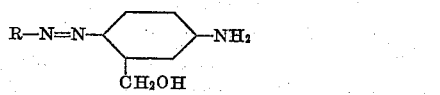

wherein R represents an aryl nucleus of the benzene series.

3. An azo compound having the general formula:

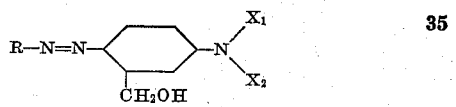

wherein $X_1$ and $X_2$ are different from each other and each represents a member selected from the class consisting of hydrogen, an alkyl group, a hydroxyalkyl group and the glyceryl radical and R represents an aryl nucleus of the benzene series.

4. The azo dye compound having the formula:

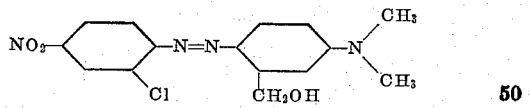

5. The process of coloring an organic derivative of cellulose which comprises applying thereto a dye selected from the class of azo compounds having the general formula:

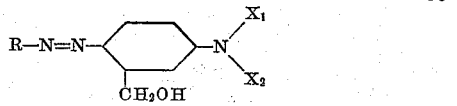

wherein $X_1$ and $X_2$ each represent a member selected from the class consisting of hydrogen, an alkyl group, a hydroxyalkyl group and the glyceryl radical and R represents a nuclear non-sulfonated aryl nucleus of the benzene series.

6. The process of coloring an organic acid ester of cellulose which comprises applying thereto a dye selected from the class of azo compounds having the general formula:

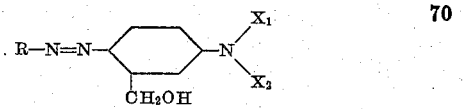

wherein $X_1$ and $X_2$ each represent a member selected from the class consisting of hydrogen, an alkyl group, a hydroxyalkyl group and the glyceryl radical and R represents a nuclear non-sulfonated aryl nucleus of the benzene series.

7. The process of coloring a cellulose acetate which comprises applying thereto a dye selected from the class of azo compounds having the general formula:

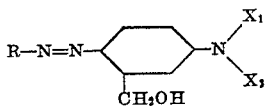

wherein $X_1$ and $X_2$ each represent a member selected from the class consisting of hydrogen, an alkyl group, a hydroxyalkyl group and the glyceryl radical and R represents a nuclear non-sulfonated aryl nucleus of the benzene series.

8. The process of coloring a cellulose acetate which comprises applying thereto a dye selected from the class of azo compounds having the general formula:

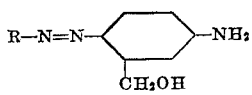

wherein R represents a nuclear non-sulfonated aryl nucleus of the benzene series.

9. The process of coloring an organic derivative of cellulose which comprises applying thereto a dye selected from the class of azo compounds having the general formula:

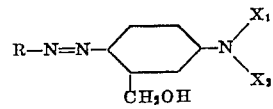

wherein $X_1$ and $X_2$ are different from each other and each represents a member selected from the class consisting of hydrogen, an alkyl group, a hydroxyalkyl group and the glyceryl radical and R represents a nuclear non-sulfonated aryl nucleus of the benzene series.

10. The process of coloring a cellulose acetate which comprises applying thereto a dye selected from the class of azo compounds having the general formula:

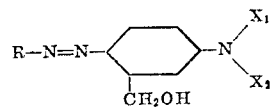

wherein $X_1$ and $X_2$ are different from each other and each represents a member selected from the class consisting of hydrogen, an alkyl group, a hydroxyalkyl group and the glyceryl radical and R represents a nuclear non-sulfonated aryl nucleus of the benzene series.

JAMES G. McNALLY.
JOSEPH B. DICKEY.